INVENTOR
MARCEL FLEURY
BY Adams + Bush
ATTORNEYS

Dec. 11, 1962   M. FLEURY   3,067,803
APPARATUS FOR MANUFACTURE OF IMPREGNATED FIBROUS TUBES
Original Filed March 11, 1953   3 Sheets-Sheet 3
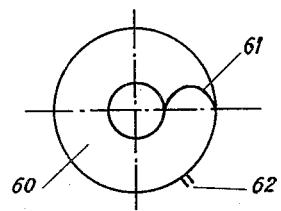
FIG. 5
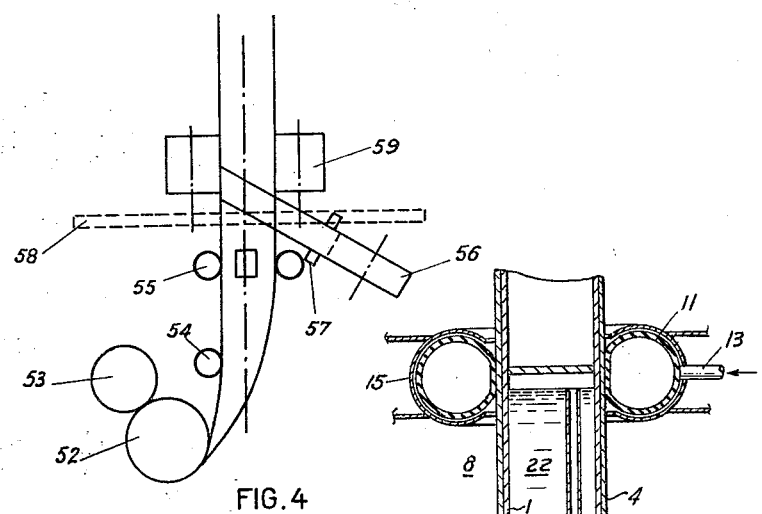
FIG. 4
FIG. 6
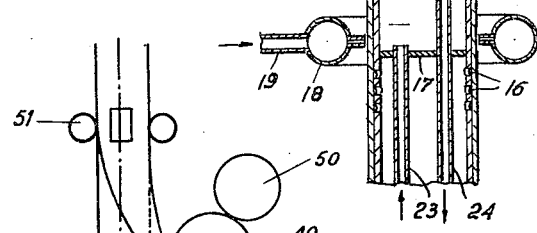
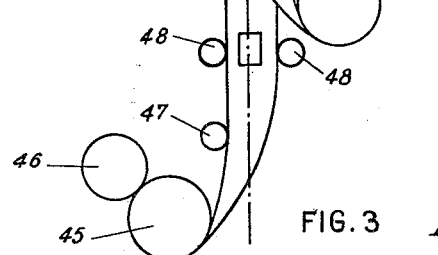
FIG. 3
INVENTOR
MARCEL FLEURY
By Adams & Bush
ATTORNEYS United States Patent Office 3,067,803
Patented Dec. 11, 1962

3,067,803
APPARATUS FOR MANUFACTURE OF
IMPREGNATED FIBROUS TUBES
Marcel Fleury, Cannes, France, assignor to Compagnie Generale d'Electricite, Paris, France, a corporation of France
Original application Ser. No. 341,709, dated Mar. 11, 1953, now abandoned. Divided and this application Oct. 8, 1958, Ser. No. 769,051
16 Claims. (Cl. 156—431)

This application is a division of the application Serial No. 341,709 by Marcel Fleury, filed March 11, 1953, and entitled "Manufacture of Impregnated Tubes," now abandoned.

The manufacture of stratified tubes having a basis of synthetic resin is already known. Such tubes are generally composed of a sheath of threads, fibres or fabrics of any kind impregnated with a synthetic resin which can be polymerised by some means.

Tubes of the type mentioned are always made in definite lengths. The reason for this is that they are manufactured by applying and impregnating threads, fibres or fabrics round a mandril so that they must not exceed the length of the latter. In this mode of production the resin is often badly distributed and the impregnation is defective owing to the fact that air remaining in the meshes of the fabric is not properly eliminated.

In addition to this, the operations for heating and drying the tube and extracting it from the mandril give rise to complications and require a large amount of labour.

The object of the present invention is the elimination of the above defects by the provision of apparatus for the manufacture of stratified tubes in an automatic and continuous manner, such apparatus being capable of producing tubes of any length desired.

Several examples of the apparatus are shown diagrammatically in the accompanying drawings, wherein:

FIGURES 3, 4 and 5 show modifications and details of certain parts of these apparatuses.

FIGURE 6 is an enlarged cross-sectional view of a portion of the apparatus shown in FIGURE 1 including the cooling chamber thereof.

Figure 1:
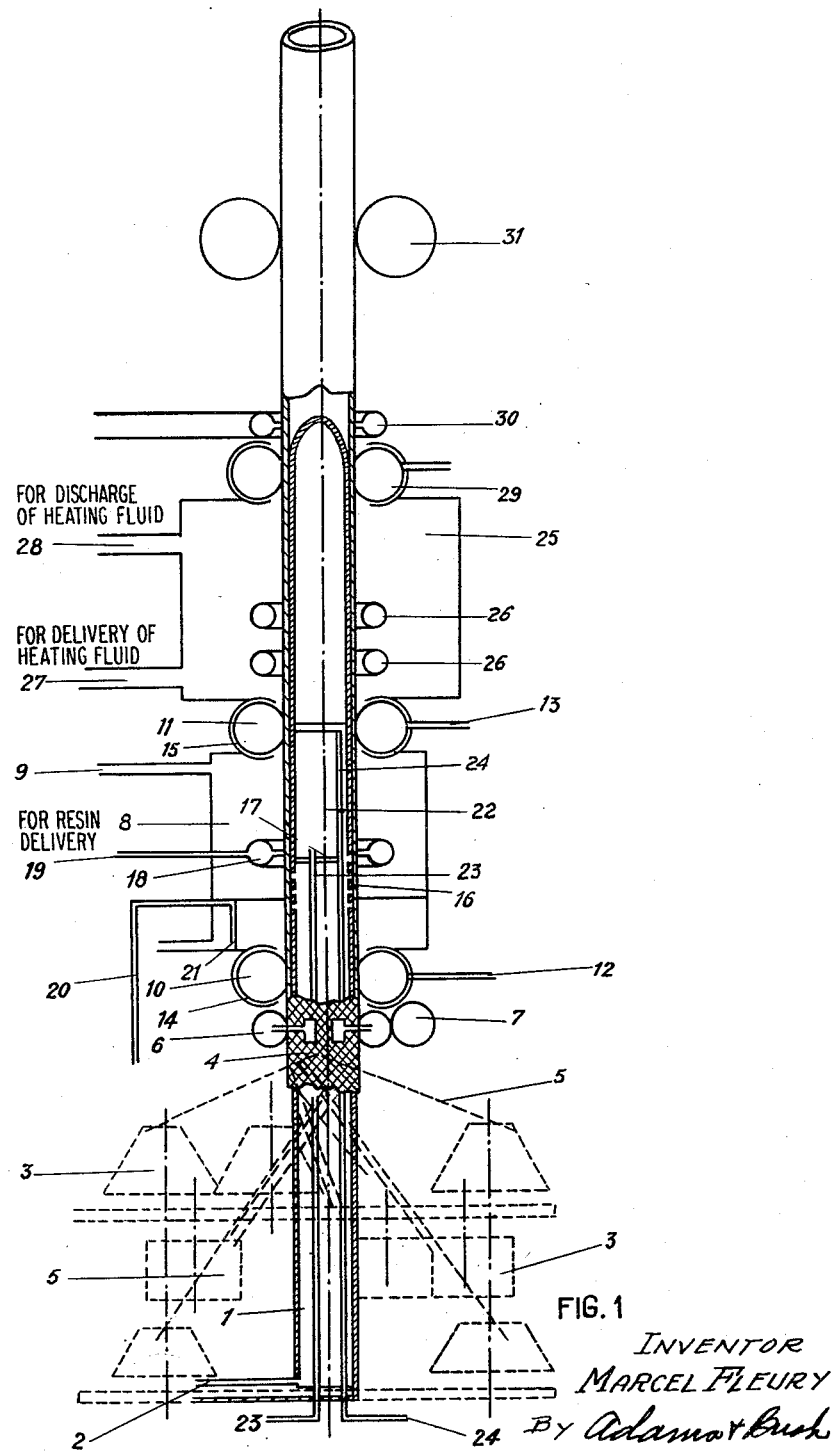
FIGURE 1 represents a general longitudinal sectional view of a complete apparatus for manufacturing a tube having one fibrous sheathing.

As shown in FIGURE 1, a mandril 1 made of metal or other material, and adapted to be filled with resin injected in through a tube 2 is surrounded by a weaving or enwinding system of any known type consisting of various bobbins 3, shown in dotted lines, provided with the proper motions so as to weave or wind a sheath 4 round the mandril 1.

This standard arrangement for tubular weaving enables a sheath to be woven which may be composed not only of fibres such as 5 of any kind carried by the bobbins 3, in the form of a fabric woven and superposed as desired, but also of such fabrics combined with backings or cores of any nature; these backings or cores may be made of any natural or synthetic material such as for example cotton, glass, asbestos or nylon, and even be made of metallic material. The entire sheath may also be made of such backings or cores.

As soon as the sheath 4 is formed it is engaged by a tightening and actuating arrangement 6 possibly in the form of bobbins or rollers, connected mechanically and driven by an arrangement 7. These bobbins or rollers press the sheath 4 against the mandril 1 and cause it to advance through their rotation.

The sheath is thus impelled and passes into the impregnation chamber 8. This chamber which is fluid-tight and may have any suitable shape completely surrounds the mandril and the sheath. A vacuum may be provided in the chamber if required by means of the connection 9.

Sealing means comprising sealing members 10 and 11 having a torus shape are provided at the inlet and outlet of the impregnation chamber 8, these sealing members forming one of the features of the present invention.

These sealing members consist of air chambers of suitable size which press the sheath 4 against the mandril 1 according to the pressure inside the air chambers the air being supplied through the connections 12 and 13. These air chambers are lodged inside the recesses 14 and 15 forming part of the impregnation chamber and having the form of a torus also as at their peripheries.

The mandril 1 is provided with orifices 16 situated inside the impregnation chamber and extending over a certain distance for allowing the resin inside the mandril 1 to escape to the outside. This action is assisted by the presence of a partition 17 which seals off the inside bore of the mandril so that the resin filling the mandril and injected through the connection 2 has no other escape.

Almost at the same level inside the impregnation chamber 8, the sheath 4 is surrounded externally by a device 18 having the form of a perforated ring. Resin passes through connection 19 into perforated ring 18 and is thereby projected onto the outside of the tubular sheath 4.

The sheath 4 is therefore impregnated with resin from the inside and the outside. This impregnation is greatly improved through the vacuum prevailing inside chamber 8 which enables any air carried into the chamber by the sheath itself or the resin to be easily eliminated.

The overflow and drainage connections 20 and 21 enable the resin inside the impregnation chamber to be kept at a constant level and to be drained off when necessary.

Directly above the level at which the impregnation is carried out there is a cooling chamber 22 inside the hollow space of the mandril, tubes 23 and 24 leading to and from this part supplying a cooling liquid which keeps the temperature rather low in order to prevent premature polymerisation of the resin.

The impregnated sheath continues its motion and passes the torus-shaped sealing means 11 separating the impregnation chamber 8 from the polymerisation chamber 25.

Beyond the level of the sealing member 11 the mandril may be made solid, as shown in the drawing, and have any suitable shape.

The mandril may also be provided with heating elements generally provided in the form of a ring round the tube as shown at 26. The connections 27 and 28 are for the delivery and discharge of a fluid to and from the chamber 25 so as to facilitate the polymerisation and give the temperature desired for this purpose.

In certain other modifications the hollow construction of the mandril may be continued beyond the sealing member 11, the hollow chamber thus formed being supplied with some fluid by a tubing analogous to the tube 23 or 24. The fluid leaves the chamber formed in this way inside the mandril by way of holes along the periphery at this part or at the end of the mandril and fills the tube as soon as the latter leaves the mandril. A certain pressure and/or temperature can be maintained in this way inside the tube thus formed, if this is desired. The fluid will of course pass out at the free end of the tube being manufactured.

On leaving the polymerisation chamber, the tube passes over the last sealing member 29 also in the form of a torus, and reaches the outside and it may receive at this point a further drying and cooling if this is needed by passing through a blowing collar 30.

When this final operation is completed the tube is gripped by the main actuating device 31 in the form of pulleys, wheels, belts or the like. It is this device which provides the constant motion of the tube through the various stages of manufacture although it is assisted at the start of the operation by the device 6.

On leaving the device 31 the tube, according to its pliancy and the use for which it is intended, is stacked in straight lengths or wound on to drums. However, the tube thus obtained can be passed once more through another arrangement identical, wholly or partly, to that described, and be provided on its external surface with a protective sheathing woven or applied in any way and impregnated with resin and polymerised if required.

A central mandril will not be used for an operation of this kind.

Figure 2:
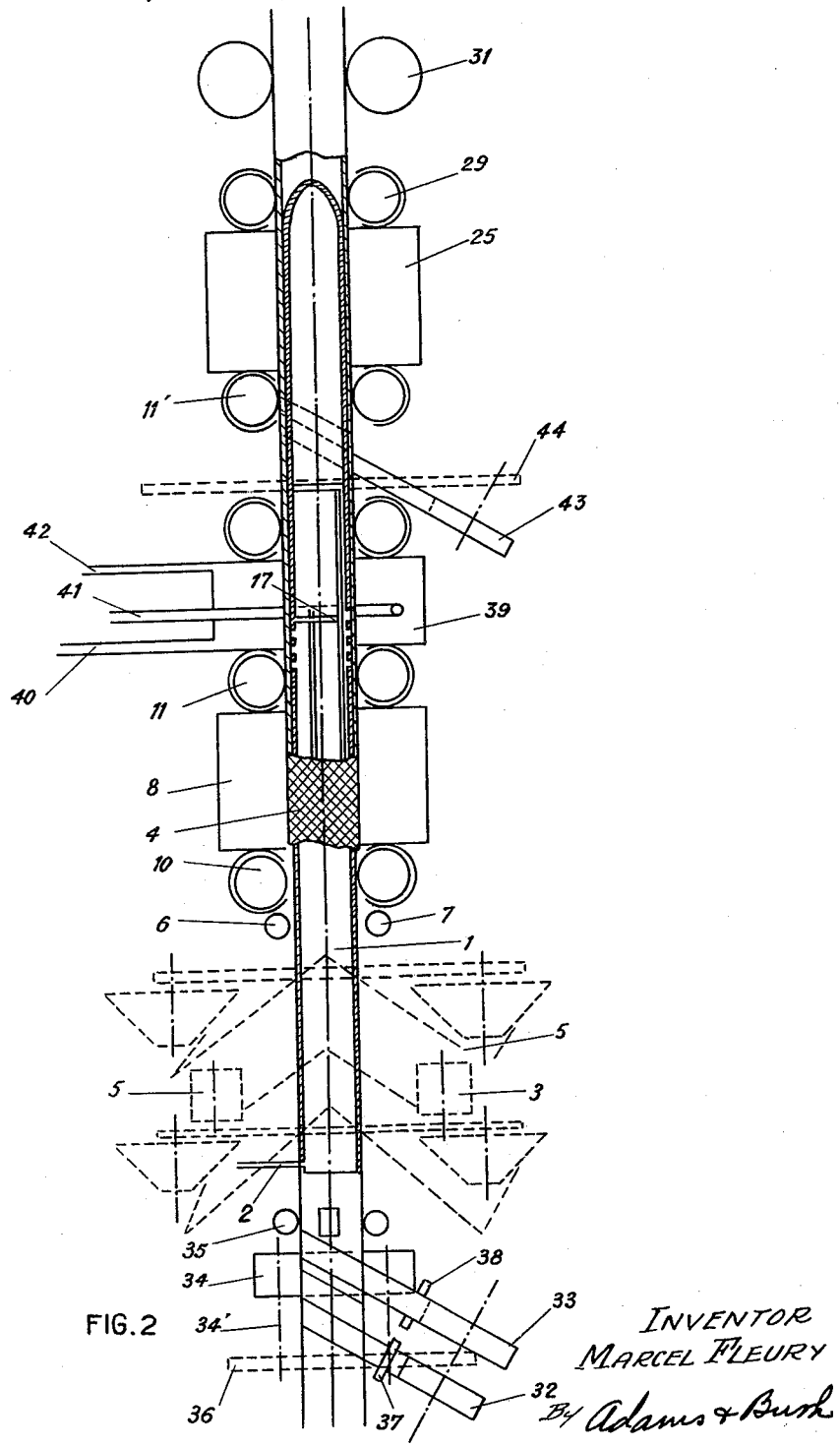
FIGURE 2 shows a modified view of the same apparatus for manufacturing a tube provided with two fibrous sheathings.

FIGURE 2 represents a general view of a modified form of apparatus for preparing a tube provided with two fibrous sheathings.

The same reference notation is used in this figure as in FIGURE 1 where the same elements are referred to. The first fibrous sheath is obtained by winding on two thicknesses of pliable stratified ribbon in the form of contiguous spiral turns, these two windings being offset in relation to one another by a distance equal to half the width of the ribbon. 32 and 33 are the two bobbins supplying the stratified ribbon and 36 is the rotary plate on which are mounted the two bobbins 32 and 33 so as to give the helical winding. Two devices 37 and 38 are mounted on the same plate for impregnating the ribbons with resin so that they will stick.

The pressure necessary for solidifying the two thicknesses is produced by imparting sufficient tension to the ribbon forming the outer layer. It is also possible to use pressure rollers 34 and 35 so as to compress one ribbon on to the other. The rollers 34 work longitudinally and are mounted on pivots 34' so as to be driven by the plate 36. The rollers 35 act transversely.

The rollers or at any rate, some of them may be heated so as to make the ribbons more pliant, and so that by starting the polymerisation of the adhesive the first fibrous sheathing may be rendered more stable.

A second fibous sheath 4 is then applied to the first sheath by means of similar equipment to that described in FIGURE 1. This second sheath is also impregnated in the chamber 8 but in this case there is a slight difference. The internal impregnation is partly effected by the pressure exerted by the weaving on the first sheath which is provided with plenty of resin and it is completed by the external impregnation effected in the chamber 8. It is of course no longer possible to use the holes 16 for the impregation of this second sheath but, as the first sheath has a tendency to adhere to the mandril owing to its structure and the nature of its joining, they may be used so as to encourage the forward motion of the tube, actuated by means of the drawing arrangement 31, 6 and 7, by supplying a lubricant or loosening agent between said tube and the outer surface of the mandril.

The arrangement illustrated in FIGURE 2 also includes a chamber 39 known as the chamber for accelerating the polymerisation. Tubing 40 enables the amount of vacuum or the pressure inside this chamber to be regulated as well as the circulation of the accelerating product in the form of a suspension or mist. Admission to tube 41 supplies the mist formed outside the chamber 39 or produced by atomisation at the outlet of the tube. The pipe 42 can be used for clearing purposes or for supplying an additional amount of the accelerating spray. The accelerating product is deposited in sufficient quantity onto the external layer of resin and enables a rapid commencement of polymerisation of the latter to be effected.

The next operation is the binding of the tube, this being done by means of the bobbin 43 provided with a device for tensioning the binder ribbon. The bobbin 43 is driven by a rotary plate 44 which is centered in the general axis of the machine.

The principal purpose of the binding operation is to squeeze out the excess resin in the tube. To effect this, the binding operation is performed, according to the invention, immediately before the polymerisation. This binding operation consists in winding non-impregnated ribbon or thread under a given tension so as to constitute adjoining spiral turns on the tube. The excess resin is squeezed out and part of it impregnates the binding ribbon or threads and the rest of it running into the binding chamber or space where it can be collected.

The material used for the binding operation takes the form of a ribbon of glass fabric or a sheet of parallel threads of glass material for imparting a fine finish to the tube. The material of the binder can be however of any other kind and is in general some material which adheres or does not adhere to the resin of polyester type. The material should be non-adhering if it is only applied temporarily and its purpose is merely that of eliminating the excess resin but if it is to remain permanently in position it will be made of adherent material.

When a temporary binding is employed, it is possible to use cellophane ribbon, a film of polyvinyl alcohol or a metallic hooping which can be unwound after the tube emerges from the polymerisation chamber. If a thin flexible metallic band is employed for the binding it can be used for producing the polymerisation of the resin by heating the tube by means of an electric current passing through the binding supplied thereto by suitable sliders.

An arrangement of this kind enables the polymerisation chamber to be suppressed or in any case it reinforces its action.

A temporary binding can be superposed over final binding material if polymerisation by means of electric heating is preferred.

The binding illustrated in FIGURE 2 is assumed to be permanent and consists for instance of a ribbon of glass silk material. The remaining parts of the installation are equipped and function as explained in connection with FIGURE 1.

FIGURE 3 illustrates a detail modification and shows a bobbin 46 for supplying stratified ribbon in the production of a fibrous sheath. Reference numeral 45 designates a device for impregnating the ribbon with adhesive resin. Rollers 47 and 48 are provided for pressing the ribbon onto the mandril and for causing the joint to stick. A second ribbon is then applied on to the first under the same conditions having a longitudinal joint shifted round 180° in relation to the first joint. Reference numeral 50 designates the supply bobbin, 49 the impregnating roller and 51 the pressure rollers.

FIGURE 4 shows a modification of the embodiment of FIGURE 3, in which the second thickness of the stratified ribbon is represented by a spiral type winding with the turns in contact. In this FIGURE, 53 is the supply bobbin of the first ribbon which is placed longitudinally, 52 being the impregnating arrangement and 54 and 55 representing the pressure rollers. This first ribbon is preferably provided with an overlapping joint. The bobbin of stratified ribbon for the spiral winding is shown at 56 while 57 is the impregnating device, 59 the pressure rollers and 58 is the rotary plate which drives this arrangement.

Finally, FIGURE 5 shows a view of a resilient torus sealing member used for rendering the chambers fluidtight when a tube is traversing them in course of manufacture. The said sealing member is a simple tube 60 of rubber for instance having a circular or oval cross-section. This tube is closed at one of its ends with a spherical cap 61, the sealing member being formed by bending the tube round in a circle into the form of a torus and inserting the male cap 61 into the female end of the tube. The sealing member is provided with a valve 62 so that is can be blown up inside the recess provided for it at the inlet or outlet parts of a chamber.

I claim:

1. Apparatus for manufacturing stratified tubes of any length comprising a hollow mandril, said mandril being fixed in position, means for applying fibrous sheathing to said mandril to form the basic layer of one such tube, means for moving said fibrous sheathing along the mandril, a plurality of mutually spaced processing chambers surrounding said mandril and said tube, said chambers having inlets and outlets coaxial with said mandril, sealing means disposed in said inlets and outlets for sealing said inlets and outlets in an air-tight manner, each of said sealing means comprising a torus of resilient material in contact with said tube and filled with compressed air, said torus being effective to press said tube against said mandril.

2. Apparatus according to claim 1, wherein said mandril is provided with orifices and one of said chambers is disposed adjacent said orifices.

3. Apparatus according to claim 1, wherein said chambers are provided with sections receiving said sealing means.

4. Apparatus according to claim 1, wherein one of said chambers is disposed adjacent one end of said mandrel.

5. Apparatus according to claim 1, wherein one of said processing chambers is a polymerization chamber provided with means for the reception and discharge of fluid.

6. Apparatus according to claim 1, wherein one of said processing chambers is an impregnation chamber, said chamber being provided with conduit means for the reception and discharge of fluids.

7. Apparatus according to claim 6, in which a perforated ring adapted to receive resin is disposed in said impregnation chamber adjacent said mandril.

8. Apparatus according to claim 1, wherein said mandril is provided with heating means comprising at least one ring surrounding said mandril.

9. Apparatus according to claim 1, wherein said means for moving said fibrous sheathing along said mandril comprises rotatable rollers and means for driving said rollers.

10. Apparatus according to claim 1, wherein two of said plurality of processing chambers are polymerization chamber, having means for the reception and discharge of fluids.

11. Apparatus according to claim 1, wherein a means for binding said tube is disposed adjacent to said mandril and intermediate two of said chambers.

12. Apparatus according to claim 1, wherein said means for applying fibrous sheathing to said mandril comprises means for applying two thicknesses of stratified ribbon for forming said fibrous sheathing, said means for moving said fibrous sheathing along the mandril comprising roller means disposed adjacent one said torus.

13. Apparatus according to claim 12, wherein said means for applying two thicknesses of stratified ribbon comprises means for applying the said stratified ribbon in each of said two thicknesses spirally of said mandril.

14. Apparatus according to claim 12, wherein said means for applying two thicknesses of stratified ribbon comprises means for applying the stratified ribbon in one of said two thicknesses spirally of said mandril and for applying the stratified ribbon in the other of said thicknesses longitudinally of said mandril.

15. Apparatus according to claim 12, wherein said means for applying two thicknesses of stratified ribbon comprises means for applying the said stratified ribbon in each of said two thicknesses longitudinally of said mandril.

16. Apparatus according to claim 1, wherein said torus consists of a rubber tube, a cap closing one end of said tube, said one end being received by the other end of said tube, an air valve in said tube, said torus surrounding said tube.

References Cited in the file of this patent

UNITED STATES PATENTS

| 776,150 | Smith | Nov. 29, 1904 |
| 2,145,279 | Spaulding | Jan. 31, 1939 |
| 2,602,959 | Fenlin | July 15, 1952 |
| 2,647,488 | Shive | Aug. 4, 1953 |
| 2,723,705 | Collins | Nov. 15, 1955 |
| 2,725,091 | Miner et al. | Nov. 29, 1955 |
| 2,731,067 | Miller | Jan. 17, 1956 |
| 2,749,643 | Scott | June 12, 1956 |
| 2,756,458 | Krupp et al. | July 31, 1956 |
| 2,767,431 | De Laubarede | Oct. 23, 1956 |
| 2,815,043 | Kleiner et al. | Dec. 3, 1957 |